US005719469A

United States Patent [19]

Leupold

[11] Patent Number: 5,719,469

[45] Date of Patent: Feb. 17, 1998

[54] SPHERICAL MAGNET HAVING A GAP WITH A PERIODICALLY VARYING FIELD FOR A WIGGLER RADIATION SOURCE

[75] Inventor: Herbert A. Leupold, Eatontown, N.J.

[73] Assignee: The United States of America as represented by the Secretary of the Army, Washington, D.C.

[21] Appl. No.: 579,698

[22] Filed: Dec. 28, 1995

[51] Int. Cl.$^6$ .............................. H01J 25/00; H01S 3/00; H01F 7/02

[52] U.S. Cl. .............................. 315/4; 372/2; 372/37; 335/306

[58] Field of Search .............................. 315/4; 372/2, 37; 335/302, 306

[56] References Cited

U.S. PATENT DOCUMENTS 4,949,344 8/1990 van Steenbergen .............................. 372/2
5,382,936 1/1995 Leupold et al. .............................. 335/306
5,486,802 1/1996 Leupold .............................. 335/306

*Primary Examiner*—Robert Pascal
*Assistant Examiner*—Justin P. Bettendorf
*Attorney, Agent, or Firm*—Michael Zelenka; John M. O'Meara

[57] ABSTRACT

A spherical magnet structure having an axis about which an equatorial gap is disposed into the periphery thereof, is constructed to sustain a magnetic field across the gap with the field magnitude varying periodically over a circular pattern in a plane passing perpendicularly through the axis. Such construction includes magnet segments which are configured and aligned across the gap in wedge-shaped arrangements to sustain magnetic field contributions thereacross. A source of wiggler radiation is derived by combining the magnet structure with means for introducing charged particles into the gap thereof, wherein the field influences the particles to travel circularly in a continuous periodic path.

38 Claims, 3 Drawing Sheets

SPHERICAL MAGNET HAVING A GAP WITH A PERIODICALLY VARYING FIELD FOR A WIGGLER RADIATION SOURCE

GOVERNMENT INTEREST

The invention described herein may be manufactured, used, and licensed by or for the United States Government for governmental purposes without payment to me of any royalties thereon.

BACKGROUND OF THE INVENTION

The present invention relates generally to spherical magnet structures and more particularly, to such structures for use in wiggler radiation sources.

Wiggler radiation is generated by directing charged particles through a magnetic field of periodically varying magnitude. Magnet arrangements for generating such a field along a linear path, are well known. In these arrangements, a plurality of individual magnet structures are disposed along the path on both sides thereof, to provide counter fields in opposite directions thereacross. Although such arrangements can be utilized to derive wiggler radiation, the counter fields thereof severely reduce magnetic efficiency. Otherwise, the charged particles that emit the wiggler radiation can only travel the linear path of such magnet arrangements once, which is also inefficient.

SUMMARY OF THE INVENTION

It is the general object of the present invention to provide a spherical magnet structure having a peripherally disposed equatorial gap across which a magnetic field of periodically varying magnitude is sustained over a circular pattern.

It is a specific object of the present invention to incorporate the magnet structure of the general object into a wiggler radiation source.

These and other objects are accomplished in accordance with the present invention by constructing the spherical magnet structure with a shell having a core centrally disposed therein, about an axis therethrough. The equatorial gap extends into the magnet structure from the periphery of the shell and cooperating pairs of magnet segments are located across the gap in the shell and/or the core to sustain a magnetic field contribution thereacross. For some preferred embodiments of the magnet structure, adjacent pairs of magnet segments are separated by nonmagnetic spacings therebetween, while adjacent magnet segments are interfacing in other preferred embodiments of the magnet structure. To construct the wiggler radiation source, charged particles are directed into the equatorial gap and influenced by the field therein to travel about the circular field pattern, while periodically traversing thereacross.

The scope of the present invention is only limited by the appended claims for which support is predicated on the preferred embodiments hereinafter set forth in the following description and related drawings wherein like reference characters relate to like parts throughout the figures thereof.

DESCRIPTION OF THE PREFERRED EMBODIMENTS

Of fundamental importance to the present invention is a magnet structure 10 of spherical configuration, regarding which embodiments are shown in FIGS. 1–4. Included in the structure 10 is a spherical shell 12 having a core 14 centrally disposed therein about an axis 16 passing therethrough. To establish a magnetic circuit within the structure 10, different magnetic materials are utilized in the shell 12 and the core 14, such as active material (permanently magnetic) in the shell 12 and passive material (iron) in the core 14, or different active materials in the shell 12 and the core 14.

Figure 1:
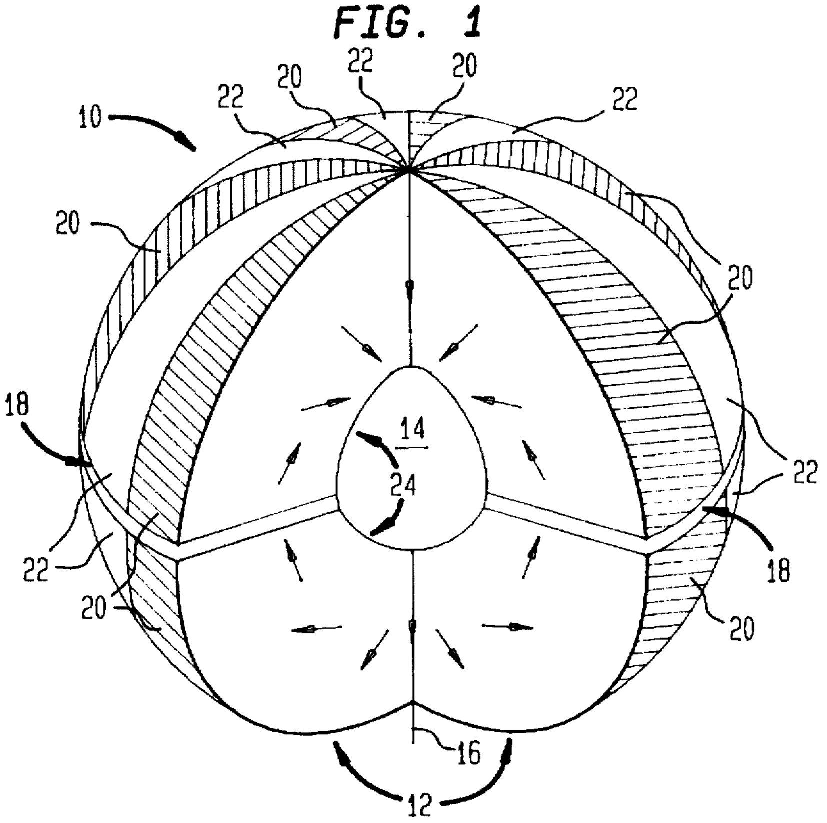
FIG. 1 is a cutaway, isometric view regarding a first magnet structure accordance with the invention.
Figure 2:
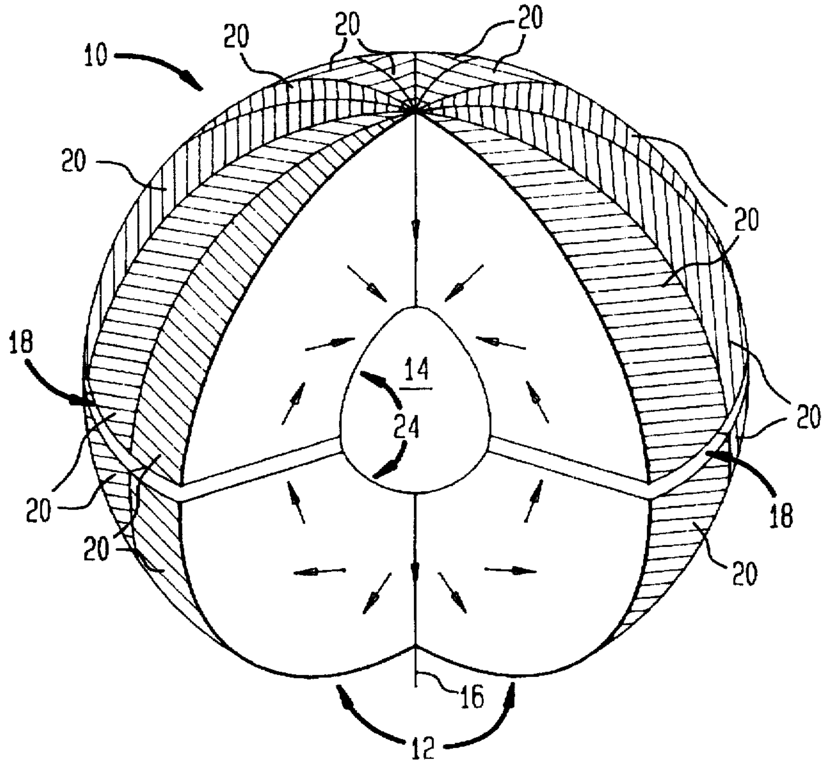
FIG. 2 is an cutaway, isometric view regarding a second magnet structure in accordance with the invention.
Figure 3:
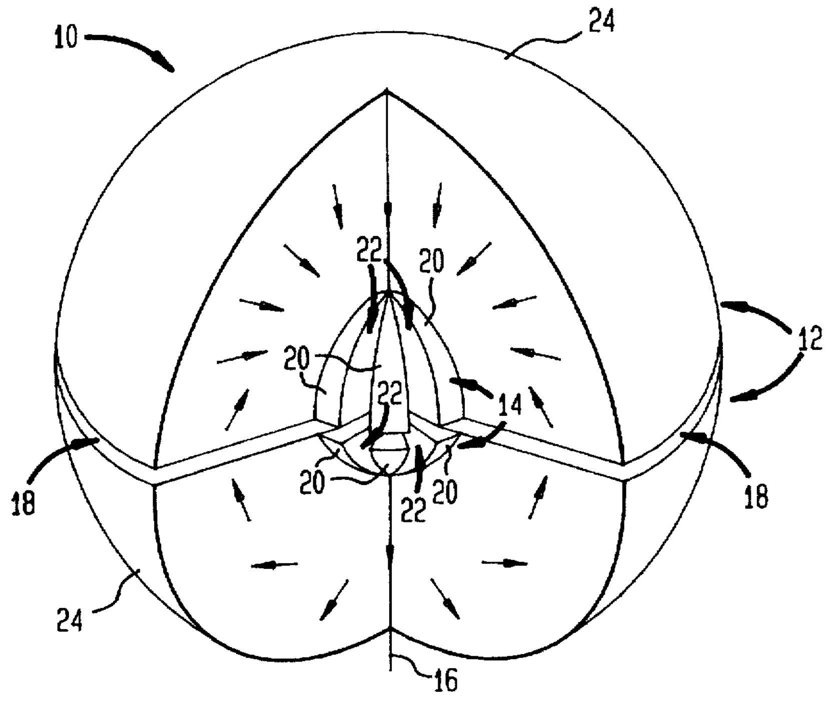
FIG. 3 is a cutaway, isometric view regarding a third magnet structure in accordance with the invention.
Figure 4:
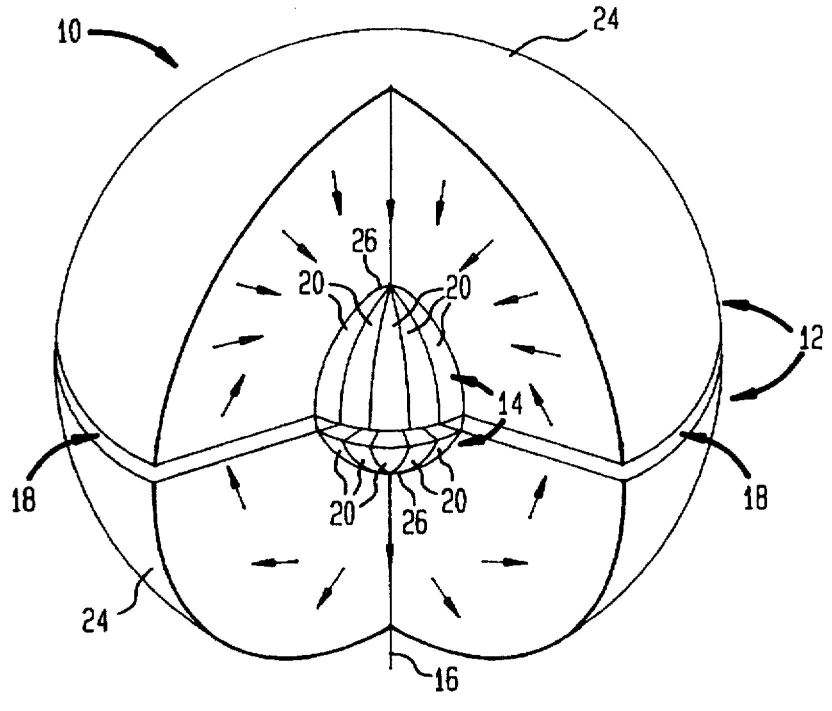
FIG. 4 is a cutaway, isometric view regarding a fourth magnet structure in accordance with the invention.

An equatorial gap 18 extends into the magnet structure 10 about the periphery of the shell 12. Within the structure 10, pairs of magnet segments 20 are configured and aligned across the gap 18 in wedge-shaped arrangements wherein magnetic field contributions parallel to the axis 16 are sustained across the gap 18. The wedge-shaped arrangements may be disposed in the shell 12 and/or core 14, and may have nonmagnetic spacings 22 disposed therebetween as shown in FIGS. 1 and 3, or be interfacing as shown in FIGS. 2 and 4. Consequently, the segments 20 must have wedge like configurations which are arranged in the magnet structure 10 to extend therein relative to axis 16 with increasing thickness or taper, as illustrated in FIGS. 1–4. All of the segments in the wedge-shaped arrangements are fabricated of permanently magnetic material and magnetized in accordance with the relative disposition of segments 20 adjacent thereto. Although the wedge taper is the same for all of the segments 20 in the magnetic structures 10 of FIGS. 1–4, adjacent segments 20 in magnetic structures 10 of the invention could be fabricated with the same magnetic material and different wedge tapers. Therefore, the magnitudes of the field contributions sustained by the wedge-shaped arrangements in FIGS. 1–4 are substantially determined by the permanently magnetic material and wedge taper thereof. However, magnetic inserts could be utilized in the segments 20 for other embodiments of the invention. The magnetization vector of each wedge-shaped arrangement turns through 360°, as shown in FIGS. 1–4, so that a magnetic field contribution is derived therefrom. As a group the wedge-shaped arrangements distribute the field so that the magnitude thereof varies periodically over a circular pattern in an equatorial plane passing perpendicularly through the axis 16. The segments 20 are secured in the magnet structure 10 such as with suitable adhesive, for example epoxy.

In the magnet structures 10 of FIGS. 1 and 2, the equatorial gap 18 extends through the shell 12 to the core 14 and the segments 20 are disposed in the shell 12, according to the magnitude variation of the desired periodic field. Shell 12 in these magnet structures 10 includes a pair of matching hemispheres 24 aligned along the axis 16 about the core 14, with the gap 18 separating the hemispheres 24. A plurality of segments 20 are included in each hemisphere 24 and each segment 20 in one hemisphere 24 is aligned across the gap 18 with one segment 20 in the other hemisphere 24, to sustain a field contribution or vector thereacross. Nonmagnetic spacings 22 are disposed between adjacent segments 20 in each hemisphere 24 of the FIG. 1 magnet structure 10. Great versatility exists relative to such nonmagnetic spacings 22, which may be empty or may contain suitable material, for example epoxy. Although the configuration of material within the nonmagnetic spacings 22 is essentially unrestricted, that configuration must not penetrate into the gap 18. Adjacent segments 20 in each hemisphere 24 of the FIG. 2 magnet structure 10, are interfacing and fabricated to sustain field contributions of different magnitudes, such as with different permanently magnetic material being utilized in such segments 20.

Equatorial gap 18 extends through both the shell 12 and the core 14 in the magnet structures 10 of FIGS. 3 and 4, while the segments 20 are disposed in the core 14 thereof. However, shell 12 in these magnet structures 10 again includes the pair of matching hemispheres 24 aligned along the axis 16 about the core 14, with the gap 18 separating the hemispheres 24. Core 14 also includes a pair of matching hemispheres 26 aligned along the axis 16, with the gap 18 separating therebetween. A plurality of the segments 20 are included in each hemisphere 26 and each segment 20 in one hemisphere 26 is aligned across the gap 18 with one segment 20 in the other hemisphere 26, to sustain a field contribution or vector thereacross. Nonmagnetic spacings 22 are disposed between adjacent segments 20 in each hemisphere 26 of the FIG. 3 magnet structure 10. Again great versatility exists relative to the nonmagnetic spacings 22, which may be empty as shown in FIG. 3, or may contain suitable material, for example epoxy. When the nonmagnetic spacings 22 contain suitable material, the configuration thereof is essentially unrestricted, except that configuration must not penetrate into the gap 18. Adjacent segments 20 in each hemisphere 26 of the FIG. 4 magnet structure 10 are interfacing and fabricated to sustain field contributions of different magnitudes, such as with different permanently magnetic material being utilized in such segments 20.

Although other applications may be possible for the magnet structures 10 of FIGS. 1–4, wiggler radiation sources are the only application suggested herein for such structures. As discussed previously herein, a field having a periodically varying magnitude is fundamental to any wiggler radiation source and only magnet structures which sustain such fields along a linear path are known in the prior art. It is well known that these prior art magnet structures are inherently inefficient because they sustain counter fields in opposite directions across the linear path and charged particles introduced to such fields travel the linear path only once.

Figure 5:
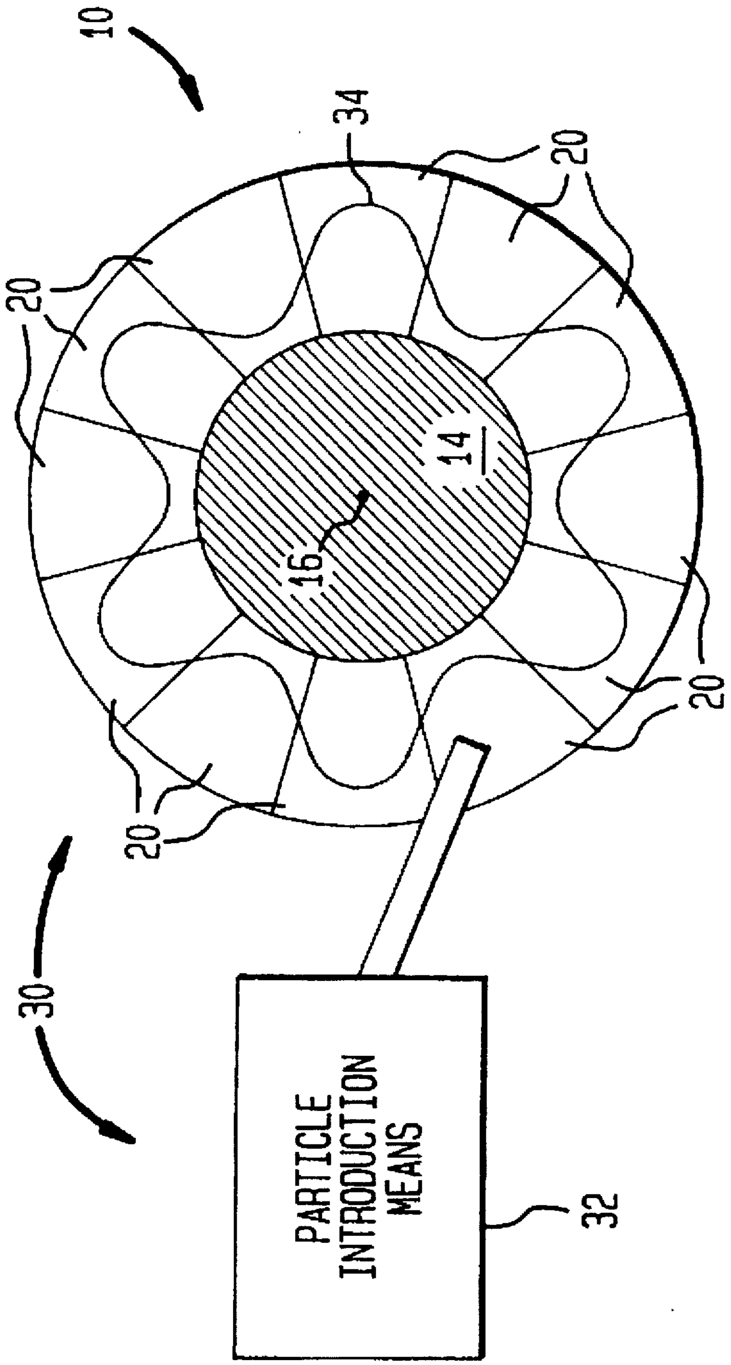
FIG. 5 is a block diagram/equatorial section view of a wiggler radiation source in accordance with the invention.

A wiggler radiation source 30 in accordance with the invention is illustrated in FIG. 5. The FIG. 2 magnet structure 10 of the invention is incorporated into the radiation source 30. However, any magnet structure in accordance with the invention could be incorporated thereinto, such as those illustrated in FIGS. 1 and 3–4. Radiation source 30 includes means 32 disposed in proximity to the magnet structure 10 for introducing charged particles within the equatorial gap 18 thereof, to the plane which bears the circular pattern of the periodically varying magnetic field. The field contributions of the segments 20 all pass in the same direction through the gap 18 and influence the travel of the charged particles to guide them about the circular pattern in a continuous periodic path 34 that traverses thereacross. As will be understood by those skilled in the magnetic arts without further explanation, particle location in path 34 at any time, is determined by the centrifugal force on the particle due to its circular velocity and the centripetal force exerted thereon by the field. In FIG. 5, the traverse of the periodic path 34 within the circular pattern is exaggerated to facilitate an understanding of the invention. Consequently, wiggler radiation is generated by the charged particles and passes radially from the magnet structure 10 relative to axis 16, through the gap 18. A conventional electron gun could serve as the particle introduction means 32 and would direct the charged particles into the gap 18.

Relative to conventional wiggler radiation sources, many advantages are realized with the wiggler radiation source 30 of the invention. All the field vectors relating to wiggler radiation source 30, are in the same direction. Consequently, the counter fields which exist in conventional wiggler radiation sources are avoided by the invention to thereby enhance magnetic efficiency. Also, charged particles that are introduced to the field in source 30 can repeatedly travel the periodic path 34 while migrating toward the axis 16, as the velocity of those particles decreases. Those skilled in the art of wiggler radiation will understand without any further explanation that the velocity and direction of such particles when introduced as well as the location where such introduction occurs into the field, must be controlled, in accordance with the magnetic and configurational parameters of the structure 10. Consequently, the direction of particle introduction shown in FIG. 5 is only one of many possibilities within the scope of the invention. As is readily apparent from FIG. 5, the frequency and traverse of the periodic path 34 relate to the number of segments 20 disposed in the magnet structure 10 and the magnitudes of the field contributions sustained thereby. For the sake of design simplicity, the field contributions sustained by the segments 20 can all be of the same magnitude when FIG. 1 magnet structure is incorporated in the radiation source 30 of FIG. 5.

Those skilled in the art will appreciate without any further explanation that within the concept of this invention, many modifications and variations are possible in the above disclosed spherical magnet structure and wiggler radiation source embodiments. Consequently, it should be understood that all such modifications and variations fall within the scope of the following claims.

What I claim is:

1. A magnet structure, comprising:

a spherical shell and core having different magnetic characteristics, the core being centrally disposed within the shell about an axis therethrough and an equatorial gap extends into the structure about the periphery of the shell, pairs of magnet segments within the structure are configured and aligned across the gap in wedge-shaped arrangements wherein magnetic field contributions parallel to the axis are sustained across the gap, with the magnitude of the field contributions varying periodically over a circular pattern in a plane passing perpendicularly through the axis.

2. The magnet structure of claim 1 wherein the gap extends through the shell to the core and the magnet segments are disposed in the shell which includes a pair of matching hemispheres aligned along the axis about the core with the gap separating the hemispheres, each hemisphere being constructed from a plurality of the magnet segments with each segment in one hemisphere being aligned across the gap with one segment in the other hemisphere.

3. The magnet structure of claim 2 wherein the wedge-shaped arrangements are disposed with the taper thereof increasing radially from the axis.

4. The magnet structure of claim 3 wherein the wedge-shaped arrangements sustain field contributions in the same direction.

5. The magnet structure of claim 4 wherein adjacent magnet segments in each hemisphere are separated by nonmagnetic spacings.

6. The magnet structure of claim 5 wherein the wedge-shaped arrangements sustain field contributions of the same magnitude.

7. The magnet structure of claim 6 wherein the magnet segments in each hemisphere are fabricated with the same magnetic material and wedge taper.

8. The magnet structure of claim 4 wherein adjacent magnet segments in each hemisphere are interfacing.

9. The magnet structure of claim 8 wherein adjacent wedge-shaped arrangements sustain field contributions of different magnitudes.

10. The magnet structure of claim 9 wherein adjacent magnet segments in each hemisphere are fabricated with different magnetic materials and the same wedge taper.

11. The magnet structure of claim 1 wherein the gap extends through both the shell and the core with the magnet segments being disposed in the core which includes a first pair of matching hemispheres aligned along the axis with the gap separating therebetween, while the shell includes a second pair of matching hemispheres aligned along the axis about the core with the gap separating that second pair of matching hemispheres, each first pair hemisphere being constructed from a plurality of the magnet segments with each segment in one first pair hemisphere being aligned across the gap with one segment in the other first pair hemisphere.

12. The magnet structure of claim 11 wherein the wedge-shaped arrangements are disposed with the taper thereof increasing radially from the axis.

13. The magnet structure of claim 12 wherein the wedge-shaped arrangements sustain field contributions in the same direction.

14. The magnet structure of claim 13 wherein adjacent magnet segments in each first pair hemisphere are separated by nonmagnetic spacings.

15. The magnet structure of claim 14 wherein the wedge-shaped arrangements sustain field contributions of the same magnitude.

16. The magnet structure of claim 15 wherein the magnet segments in each first pair hemisphere are fabricated with the same magnetic material and wedge taper.

17. The magnet structure of claim 13 wherein adjacent magnet segments in each first pair hemisphere are interfacing.

18. The magnet structure of claim 17 wherein adjacent wedge-shape arrangements sustain field contributions of different magnitudes.

19. The magnet structure of claim 18 wherein adjacent magnet segments in each first pair hemisphere are fabricated with different magnetic materials and the same wedge taper.

20. A wiggler radiation source, comprising:

a magnet structure having a spherical shell and core with different magnetic characteristics, the core being centrally disposed within the shell about an axis therethrough and an equatorial gap extends into the structure about the periphery of the shell, pairs of magnet segments within the structure are configured and aligned across the gap in wedge-shaped arrangements wherein magnetic field contributions parallel to the axis are sustained across the gap, with the magnitude of the field contributions varying periodically over a circular pattern in a plane passing perpendicularly through the axis; and means for introducing charged particles into the gap wherein the field influences the particles to travel circularly within the pattern in a continuous periodic path which traverses thereacross and thereby generate wiggler radiation that is emitted from the gap.

21. The radiation source of claim 20 wherein the gap extends through the shell to the core and the magnet segments are disposed in the shell which includes a pair of matching hemispheres aligned along the axis about the core with the gap separating the hemispheres, each hemisphere being constructed from a plurality of the magnet segments with each segment in one hemisphere being aligned across the gap with one segment in the other hemisphere.

22. The radiation source of claim 21 wherein the wedge-shaped arrangements are disposed with the taper thereof increasing radially from the axis.

23. The radiation source of claim 22 wherein the wedge-shaped arrangements sustain field contributions in the same direction.

24. The radiation source of claim 23 wherein adjacent magnet segments in each hemisphere are separated by nonmagnetic spacings.

25. The radiation source of claim 24 wherein the wedge-shaped arrangements sustain field contributions of the same magnitude.

26. The radiation source of claim 25 wherein the magnet segments in each hemisphere are fabricated with the same magnetic material and wedge taper.

27. The radiation source of claim 22 wherein adjacent magnet segments in each hemisphere are interfacing.

28. The radiation source of claim 27 wherein adjacent wedge-shaped arrangements sustain field contributions of different magnitudes.

29. The radiation source of claim 28 wherein adjacent magnet segments in each hemisphere are fabricated with different magnetic materials and the same wedge taper.

30. The radiation source of claim 20 wherein the gap extends through both the shell and the core with the magnet segments being disposed in the core which includes a first pair of matching hemisphere aligned along the axis with the gap separating therebetween, while the shell includes a second pair of matching hemisphere aligned along the axis about the core with the gap separating that second pair of matching hemispheres, each first pair hemispheres being constructed from a plurality of the magnet segments with each segment in one first pair hemisphere being aligned across the gap with one segment in the other first pair hemisphere.

31. The radiation source of claim 30 wherein the wedge-shaped arrangements are disposed with the taper thereof increasing radially from the axis.

32. The radiation source of claim 31 wherein the wedge-shaped arrangements sustain field contributions in the same direction.

33. The radiation source of claim 32 wherein adjacent magnet segments in each first pair hemisphere are separated by nonmagnetic spacings.

34. The radiation source of claim 33 wherein the wedge-shaped arrangements sustain field contributions of the same magnitude.

35. The radiation source of claim 34 wherein the magnet segments in each first pair hemisphere are fabricated with the same magnetic material and wedge taper.

36. The radiation source of claim 32 wherein adjacent magnet segments in each first pair hemisphere are interfacing.

37. The radiation source of claim 34 wherein adjacent wedge-shaped arrangements sustain field contributions of different magnitudes.

38. The radiation source of claim 37 wherein adjacent magnet segments in each first pair hemisphere are fabricated with different magnetic materials and the same wedge taper.

* * * * *